United States Patent [19]

Marcus et al.

[11] 4,341,023
[45] Jul. 27, 1982

[54] DIGITAL COMPASS

[75] Inventors: Konrad H. Marcus, Holland; Robert D. Hochreiter, Saugatuck, both of Mich.

[73] Assignee: Prince Corporation, Holland, Mich.

[21] Appl. No.: 115,218

[22] Filed: Jan. 25, 1980

[51] Int. Cl.³ .............................................. G01C 17/26
[52] U.S. Cl. ..................................... 33/363 K; 33/349; 364/443
[58] Field of Search ................. 33/356, 363 K, 363 R, 33/357, 362, 349; 364/443; 340/347 P, 786

[56] References Cited

U.S. PATENT DOCUMENTS

| | | | |
|---|---|---|---|
| 2,518,258 | 8/1950 | Schulte | 33/363 K |
| 3,396,378 | 8/1968 | Keith | 340/786 |
| 3,746,842 | 7/1973 | Fowler | 33/363 K X |
| 3,786,571 | 1/1974 | Kelman | 33/363 K |
| 4,031,630 | 6/1977 | Fowler | 33/356 |
| 4,146,970 | 4/1979 | Edwards | 33/363 K |

Primary Examiner—William D. Martin, Jr.
Attorney, Agent, or Firm—Price, Heneveld, Huizenga & Cooper

[57] ABSTRACT

A digital magnetic compass provides an octant display of magnetic bearing in alphabetic characters and incorporates a magnetic sensor for providing signals representative of the orientation of the sensor with respect to the earth's magnetic field, a microprocessor for processing the signals from the sensor and for providing output signals applied to an alphabetic-type display. In the preferred embodiment of the invention the system is incorporated in a vehicle such as an automobile with the sensor remotely positioned with respect to the display.

7 Claims, 5 Drawing Figures

DIGITAL COMPASS

BACKGROUND OF THE INVENTION

The present invention relates to compasses and particularly to a compass sensor and display.

Compasses for vehicles such as automobiles typically are aftermarket items of relatively basic design. Such compasses usually attach to the dashboard area of the vehicle and are of relatively inexpensive construction including a compass card suspended by a pin bearing and mounted within a housing. They include some elemental form of adjustment or compensation mechanism. In some cases the compasses include self-contained or vehicle battery powered lighting for night use.

On the other hand, relatively sophisticated compass equipment exists for commercial use typically in the marine environment. Such prior art is represented by, for example, U.S. Pat. Nos. 3,825,823; 3,833,901; 3,835,375; 3,888,016; 3,905,121; 3,906,483 and 3,959,899. In this prior art there is disclosed magnetically responsive sensing means including in some instances slotted discs forming optical encoders for providing digital signals to electrical circuitry which in turn responds to such signals for providing in some cases a numerical digital display of degrees representing the orientation of the sensor with respect to the earth's magnetic field.

The automotive environment is one which is particularly sensitive to changing electrical fields due to the relatively large number of electrical conductors in a car, the compactness of the vehicle and the changing state of actuation of the conductors. It has been discovered, however, that particular locations in a vehicle are well adapted for the placement of sensing means, which normally would not lend themselves to the mounting to prior art mechanical-type compasses. One such location is the center portion of the rear window ledge of a vehicle and another is behind the rear view mirror. The present invention incorporates a sensor which provides electrical signals which can be applied to a remote display such that the sensor location can be incorporated in conjunction with a digital display for use in a vehicle.

SUMMARY OF THE PRESENT INVENTION

The system of the present invention comprises a sensor for providing electrical signals representative of the orientation of the sensor with respect to the earth's magnetic field. The sensor includes a light source, a diffusion cover for holding a plurality of light detectors, and a slotted cup-shaped encoder disc positioned therebetween. In one embodiment, a microprocessor is coupled to the sensing means for processing signals therefrom and for providing display output signals applied to a display for displaying at least the octant orientation of the magnetic sensor. In the preferred embodiment, the sensor is remotely positioned from the microprocessor and display unit and the display unit comprises an alphabetic-type display providing representation of the magnetic heading of the vehicle. In one installation of the invention the sensor was positioned at the rear ledge of the vehicle such as an automobile with the display and microprocessor unit being positioned on the dashboard of the vehicle. These and other features, objects and advantages of the present invention can best be understood by reference to the following description thereof together with the drawings in which:

DETAILED DESCRIPTION OF THE PREFERRED EMBODIMENT

Figure 1:
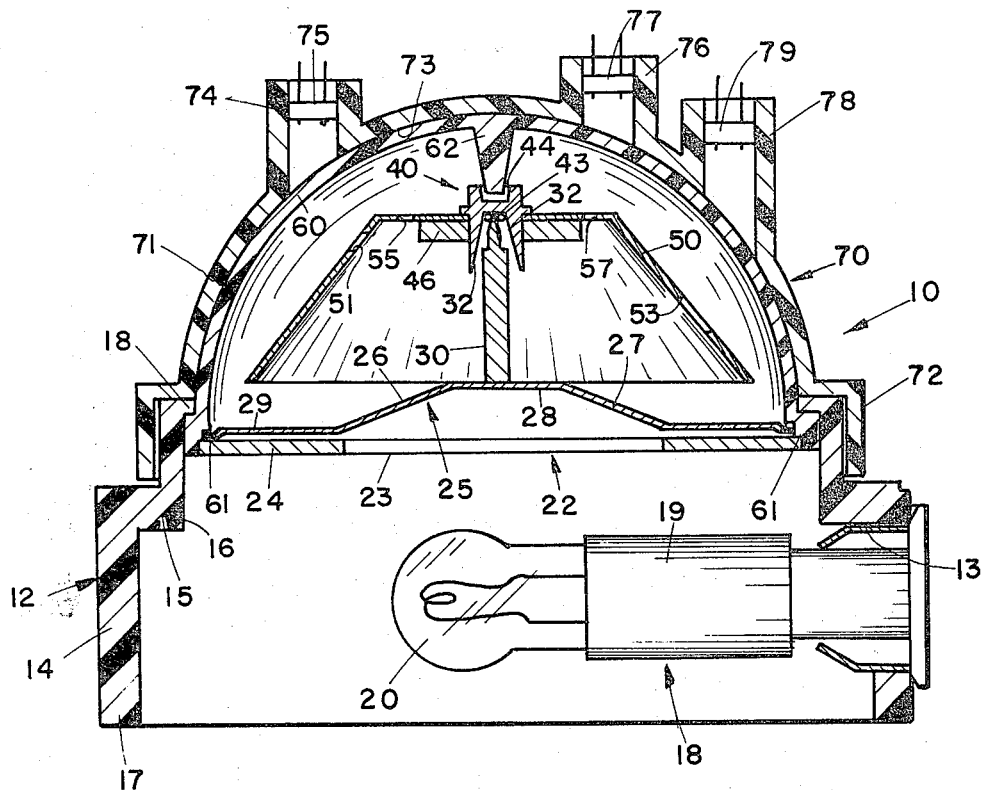
FIG. 1 is a vertical cross-sectional view of a sensor embodying the present invention.

In FIG. 1 a sensor 10 embodying the present invention includes a base 12 having a generally cylindrical lower section 14 and an inwardly stepped upper cylindrical section 16 integrally joined to section 14 by a horizontal annular section 15. The top of section 16 includes an inwardly and horizontally projecting peripheral flange 18. Base 12 further includes a radially extending aperture 13 formed through cylindrical sidewall 14 for receiving therein a lamp assembly 18 comprising a bayonet lamp socket 19 and lamp 20. Lamp 20 is a commercially available GE-type 53 and has the desired spectral characteristics for this application. Socket 19 integrally includes a pair of electrical conductors (not shown) which are coupled to a suitable power supply typically the 12 VDC electrical supply system for a vehicle such as an automobile in which the compass of the present invention is employed. The base has a flat annular bottom surface 17 and thus is adapted for and can readily be mounted to a flat surface such as the rear window ledge of an automobile. Similarly the base can be recessed within a circular aperture within the ledge by employing section 15 as a mounting flange.

Mounted under the inwardly projecting peripheral flange 18 of base 12 is the compass assembly including a beam deflecting plate 22 comprising a circular disc having a transparent circular center area 23 and an opaque annular outer band 24 preventing light from lamp 20 from being transmitted upwardly except through the transparent window formed by area 23. Positioned above and supported by plate 22 is a spring pad 25 comprising an annular outer ring 29 with a pair of integral arms 26 and 27 extending upwardly and inwardly, and terminating in an elevated circuit disc 28 to which there is mounted a vertically extending post 30. Arms 26 and 27 are relatively narrow and are positioned so as not to interfere with the upward transmission of light from source 20. Post 30 includes a needle-shaped end 32 providing one bearing surface for a needle bearing formed together with bushing 40 press fitted into the center of a cup-shaped encoder disc 50.

Bushing 40 includes an inverted cone-shaped recess 42 having a jewel bearing 43 mounted at the apex which contacts the needle point 32 of post 30 permitting free rotation of disc 50. Bushing 40 further includes a downwardly formed truncated conical recess 44 for loosely receiving therein a downwardly projecting truncated conical guidepost 62 integrally formed on a transparent acrylic hemispherical dome 60. Dome 60 includes a double stepped peripheral flange 61 defining a pair of different diameter internal annular recesses for receiving the edge of plate 22 and the edge of pad 25.

Plate 22 is sealed around the peripheral edge to dome 60 by a suitable bonding and sealing agent, and the interior hemispherical volume containing pad 25, encoder disc 50, and post 30 are filled with a fluid such as Peneteck mineral oil of technical grade providing viscous damping for the encoder disc 50. A permanent bar magnet 46 is secured to disc 50 through the press fitted bushing 40 with the bearing interconnection between bushing 40 and post 30 providing a rotating connection permitting free rotation of the encoder disc 50 such that it will seek a magnetic north direction due to the attachment of magnet 46 to the underside of disc 50.

Positioned over dome 60 is a generally hemispherical-shaped diffusion cover 70 having a hemispherical recess 73 for enclosably receiving dome 60 and its contents including encoder disc 50. Cover 70 includes an L-shaped peripheral flange 72 at its lower end which is sealably secured and bonded to the cylindrical sidewall 16 of base 12. Three cylindrical light detector receptors 74, 76 and 78 are integrally formed on the cover to provide mounting means for three light responsive detectors 75, 77 and 79 respectively which are encapsulated within the receptors. Cover 70 is made of an opaque plastic material with the receptors 74, 76 and 78 positioning their respective detectors within the recessed cylindrical central space of the receptors at a distance spaced away from the hemispherical surface 71 of the diffusion cover. Light source 20, encoder disc 50, and diffusion cover 70 cooperate together with the viscous fluid to refract and direct light from source 20 through the encoder disc as described in greater detail below, to the detectors which provide a three digit binary code providing a unique three bit signal identifying each octant of compass heading. The positioning of the receptors on the diffusion cover 70 and the formation of the encoder disc 50 to ensure the accurate generation of the three bit code can best be understood by reference to the detailed drawings of the encoder disc and diffusion cover as seen in FIGS. 2-4.

Figure 2:
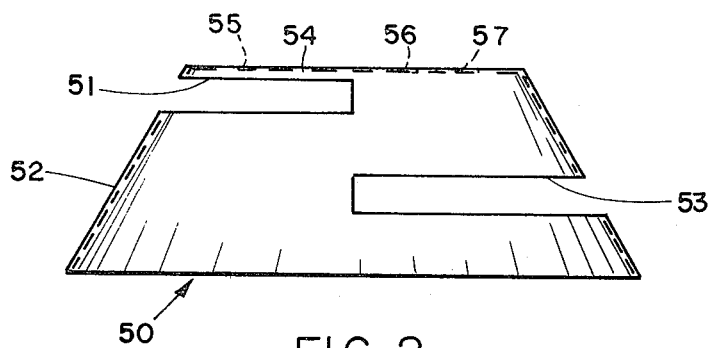
FIG. 2 is a side elevational view of an encoder disc employed with the sensor shown in FIG. 1.
Figure 3:
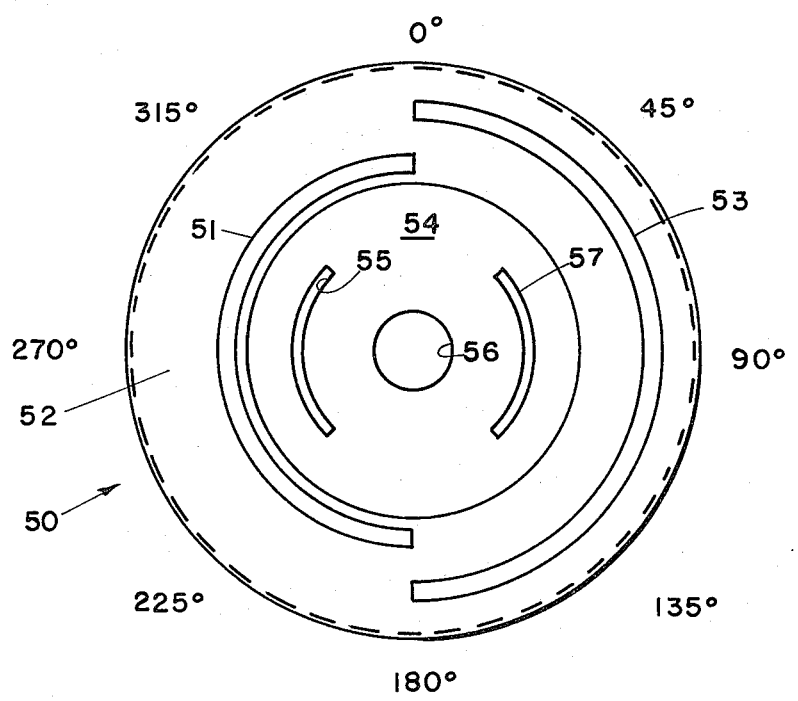
FIG. 3 is a top plan view of the encoder disc shown in FIG. 2.

As seen in FIGS. 2 and 3, the encoder disc 50 includes a conical sidewall 52 and a flat disc-shaped upper surface 54 which includes an aperture 56 for receiving the press fitted zinc cast bushing 40 shown in FIG. 1. Two semicircular generally rectangular slots 51 and 53 are formed inwardly from opposite sides of sidewall 52 of disc 50 as seen in FIGS. 2 and 3. Slots 51 and 53 are vertically spaced and each extend approximately around a mutually exclusive 180° arc of the disc as best seen in FIG. 3. The orientation of disc 50 with respect to the diffusion cover 70 is shown with the angular reference and magnetic heading positions illustrated in FIGS. 3 and 4. The top surface 54 of disc 50 includes a pair of arcuate slots 55 and 57 as best seen in FIG. 3 which extend approximately through an arc of 90° with slot 55 extending from 225° to 315° and slot 57 extending from 45° to 135°. As seen in FIG. 4, the receptors 74 and 76 are angularly positioned at approximately 157.5° with receptor 74 spaced a distance of approximately 0.775 inches from the center of the hemispherically-shaped diffusion cover which has an overall diameter of about 2.7 inches in the preferred embodiment of the invention. Thus, the light detector 75 within receptor 74 is positioned to receive light passing through slot 51 of the encoder disc 50.

Receptor 76 is also positioned at 157.5° and has a spacing of 0.307 inches from the center of the diffusion cover. Receptor 76 and its light detector 77 is thus positioned to receive light passing through slots 55 and 57 which have a radius of curvature of approximately 0.295 inches. Receptor 78 is positioned at 247.5° and is 90° from receptors 74 and 76 and positioned at a distance of 0.6 inches from the center of the diffusion cover. Receptor 78 and its light detector 79 are thus positioned to detect light transmitted through slot 53 having a radius of curvature of approximately 0.53 inches.

Figure 4:
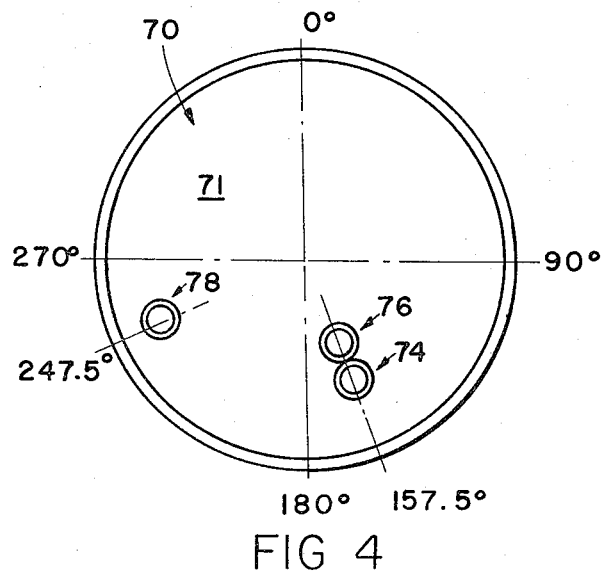
FIG. 4 is a top plan view of a diffusion cover shown also in FIG. 1.

With the slotted encoder disc oriented as shown in FIGS. 1, 2 and 3 and the diffusion cover with the light detectors positioned as shown in FIGS. 1 and 4, rotation of the compass body including the diffusion cover with respect to the encoder disc which remains generally aligned with magnetic north provides the digital signals uniquely identifying the octant headings of the compass as set forth in the following table where "0" is the logic signal from a detector and represents the blockage of light by disc 50 with respect to one of the light detectors 75, 77 or 79 and a "1" indicates the detection of light by such detectors.

| Direction | 75 | 77 | 79 |
|---|---|---|---|
| N | 0 | 0 | 0 |
| NE | 0 | 0 | 1 |
| E | 0 | 1 | 1 |
| SE | 1 | 1 | 1 |
| S | 1 | 0 | 1 |
| SW | 1 | 0 | 0 |
| W | 1 | 1 | 0 |
| NW | 0 | 1 | 0 |

Figure 5:
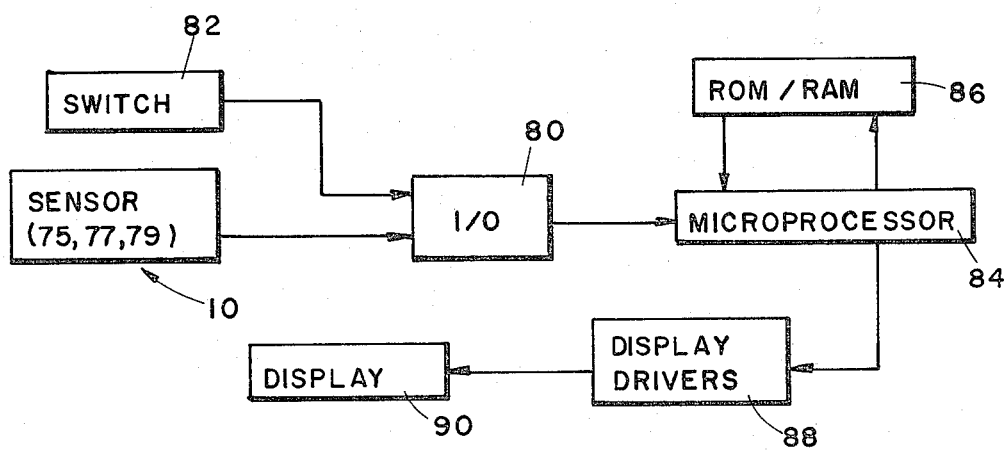
FIG. 5 is an electrical circuit diagram in block form of the system of the present invention.

As seen from the above table a unique three bit code is developed for each octant of compass heading which electrical signals are processed by the circuit shown in FIG. 5 to provide a digital alphabetic output display of the vehicle heading.

Signals from the light detectors within sensor 10 form one of the inputs to an input/output circuit 80 in FIG. 5. Circuit 80 can be a conventional resistive voltage divider circuit in the preferred embodiment where the light detectors 75, 77 and 79 (FIGS. 2 and 5) were commercially available Clairex Electronics-type CL9P9LL photo conductive cells with leads suitably fed or dressed from cover 70 to circuit 80. Another input to circuit 80 comprises a momentarily actuated push button switch 82 which provides a control signal for either providing a momentary display of the compass heading, or a continuous display of the compass heading. Detectors 75, 77 and 79 and switch 82 thus provide control signals applied to a microprocessor 84 through the input/output circuit 80. The microprocessor in the preferred embodiment was a commercially available RCA model CDP-1802E interconnected to a ROM and RAM memory 86. Memory 86 comprises an RCA CDP-1824E while the ROM comprises an EPROM which is a commercially available Mostek model B2758. The output of the microprocessor is coupled to a display driver circuit 88 and to a digital display 90 which is an alphabetical display and in the preferred embodiment comprises a commercially available vacuum fluorescent alphabetical starburst-type two digit display. The microprocessor 84 and the read only memory is programmed in accordance with the source code attached to this specification as Exhibit A and incorporated by reference herein to respond to the actuation of switch 82 and light detected by the detectors 75, 77 and 79 to provide a display of the octant heading of a vehicle in which the compass system is installed.

It has been discovered that the sensor can be positioned remotely from the remaining electrical circuitry shown in FIG. 5 and in the preferred embodiment sensor 10 was positioned in the rear window ledge approximately at the center line of the vehicle. This provides a location in which the varying magnetic fields of the vehicle's electrical system were at a minimum during normal vehicle operation. The operation of a rear window defroster coil embedded in the rear window although momentarily affecting compass operation, was not found to be objectionable since the defroster is not normally operated on a continuous basis during vehicle operation. Naturally, the components of the sensor 10 with the exception of magnet 46, are made of nonferromagnetic material. Thus, disc 50 was stamped from aluminum sheet while the remaining components were molded from thermoplastic or thermosetting materials. Diffusion cover 70 naturally is opaque and preferably has a light absorptive inner hemispherical surface mating with the outer surface of the clear acrylic dome 60. Light from source 20 selectively transmitted through encoder disc 50 is refracted outwardly by the presence of the mineral spirits within the hemispherical volume of the compass as well as by the acrylic dome 60 and is thereby directed onto the open ends of the three tunnel-like receptors for directing the desired information bearing light onto the light detectors contained by the receptors while blocking out stray light. The sensor arrangement thus provides a reliable and yet relatively inexpensive and uncomplicated structure for providing a three bit electrical code signal which can be employed to generate display control signals for a digital compass. The sensor naturally includes conventional compensating magnets (not shown) mounted to base 12 below lamp 20 permitting initial adjustment of the compass for a given installation.

Various modifications to the preferred embodiment of the invention will become apparent to those skilled in the art but will fall within the spirit and scope of the invention as defined by the appended claims.

The embodiments of the invention in which an exclusive property or privilege is claimed are defined as follows:

1. A magnetically responsive sensor for use in a compass system for a vehicle comprising:
    a base;
    a light source mounted to said base;
    a cup-shaped opaque encoder disc including a permanent magnet, said disc freely and rotatably mounted to said base so as to move with respect thereto permitting alignment with a magnetic field, said disc including a plurality of slots permitting the selective transmission of light through said disc as a function of the position of said disc with respect to said base;
    an opaque diffusion cover including a hemispherical recess for enclosing said encoder disc, said diffusion cover mounted to said base and including a plurality of recessed apertures defining receptacles for receiving a plurality of light detectors, said receptacles positioned opposite one side of said encoder disc and said light source positioned opposite the other side of said encoder disc;
    circuit means coupled to said light detectors for providing direction indicating signals in response to the sensing of light by said light detectors; and
    display means coupled to said circuit means and responsive to signals therefrom for displaying the direction of orientation of said disc with respect to said base.

2. The apparatus as defined in claim 1 wherein said recessed apertures are cylindrical and wherein a light detector is positioned in each receptacle so formed in spaced relationship from said disc such that only light from an associated slot in said encoder disc impinges upon said light detector.

3. The apparatus as defined in claim 2 and further including a beam control disc positioned between said light source and said encoder disc, said beam control disc including an opaque outer annular area and a transparent center and having a diameter slightly greater than that of said encoder disc to prevent light leakage from reaching said detectors from the outer edges of said encoder disc.

4. The apparatus as defined in claim 3 and further including a transparent dome positioned in said hemispherical recess of said diffusion cover between said diffusion cover and said encoder disc.

5. The apparatus as defined in claim 1 wherein said circuit means comprises a microprocessor circuit.

6. The apparatus as defined in claim 5 wherein said display means comprises an alphabetic display.

7. The apparatus as defined in claim 6 wherein said display means provides a unique display for each octant of compass bearing.

* * * * *

UNITED STATES PATENT AND TRADEMARK OFFICE
CERTIFICATE OF CORRECTION

PATENT NO. : 4,341,023
DATED : July 27, 1982
INVENTOR(S) : Konrad H. Marcus & Robert D. Hochreiter It is certified that error appears in the above—identified patent and that said Letters Patent is hereby corrected as shown below:

Column 2, line 48

"circuit" should be --circular--

Column 3, line 49

"illustrated" should be --identified--

Signed and Sealed this

Fifteenth Day of February 1983

[SEAL]

Attest:

GERALD J. MOSSINGHOFF

Attesting Officer    Commissioner of Patents and Trademarks